US005279033A

United States Patent [19]

Platt et al.

[11] Patent Number: 5,279,033

[45] Date of Patent: Jan. 18, 1994

[54] METHOD OF MAKING A BEAM FOR A DECORATIVE SUSPENDED CEILING

[75] Inventors: William J. Platt, Aston, Pa.; Thomas E. Rose, Dunwoody, Ga.

[73] Assignee: National Rolling Mills, Inc., Frazer, Pa.

[21] Appl. No.: 38,442

[22] Filed: Apr. 29, 1993

Related U.S. Application Data

[62] Division of Ser. No. 797,629, Nov. 25, 1991, Pat. No. 5,241,798.

[51] Int. Cl.[5] ........................ B23P 17/00; B23P 11/00; B21D 39/00

[52] U.S. Cl. .................................... 29/897.35; 29/429; 29/509; 29/514

[58] Field of Search .................. 29/897, 897.3, 897.34, 29/897.35, 429, 430, 509, 513, 514; 52/311.2, 311.3, 312, 488, 667, 716.1, 727, 730.6

[56] References Cited

U.S. PATENT DOCUMENTS

D. 268,786 4/1983 Galindo .
1,895,190 1/1933 Jansen .
1,950,223 3/1934 Budd .................................... 29/509
2,752,017 6/1956 Segil .
3,319,389 5/1967 Levine .
3,355,206 11/1967 Valsvik .............................. 403/264
3,570,198 3/1971 Ruhnke .
3,848,385 11/1974 Thompson ............................ 52/475
4,034,531 7/1977 Balinski ................................ 52/484
4,047,348 9/1977 McSweeney .
4,222,210 9/1980 Hanstein et al. .
4,422,272 12/1983 Sutter .................................... 52/484
4,505,083 3/1985 Mieyal .................................. 52/476
4,542,615 9/1985 McCall .................................. 52/729
4,554,718 11/1985 Ollinger et al. ........................ 29/514
4,852,325 8/1989 Dunn et al. ............................ 52/729

*Primary Examiner*—P. W. Echols
*Assistant Examiner*—David P. Bryant
*Attorney, Agent, or Firm*—Eugene Chovanes

[57] ABSTRACT

A grid beam of inverted T cross section for a suspended ceiling is made from a first strip of metal. A second strip is secured in the bottom of the flange of the beam by flats from the first strip, so that a three-dimensional effect from essentially flat elements results. The second strip can be of a different color as well as a different material or texture than the first strip, so that additionally a color contrast, as well as a material or surface contrast, can be achieved.

2 Claims, 3 Drawing Sheets

FIG. 7
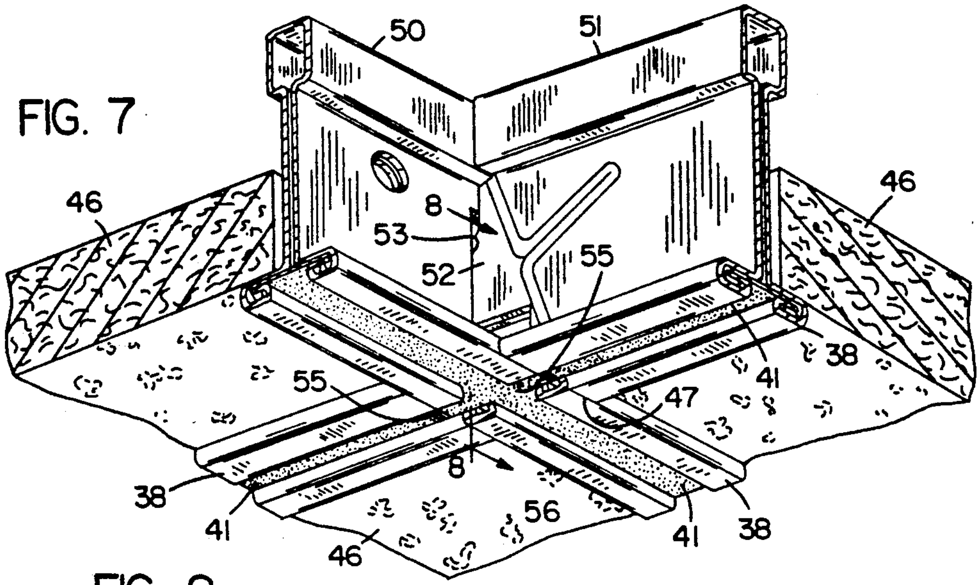
FIG. 8
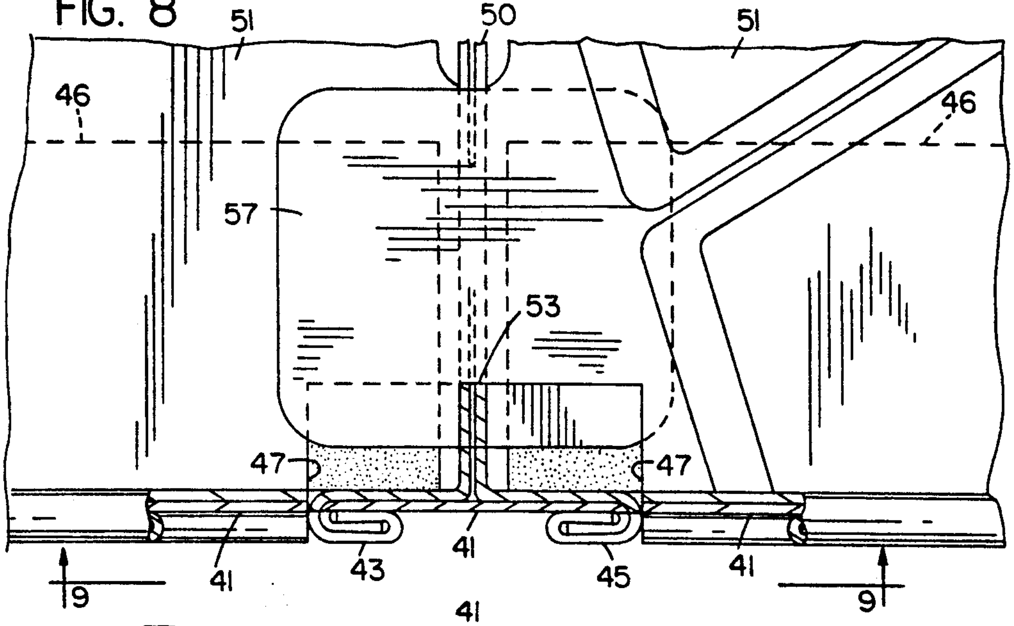
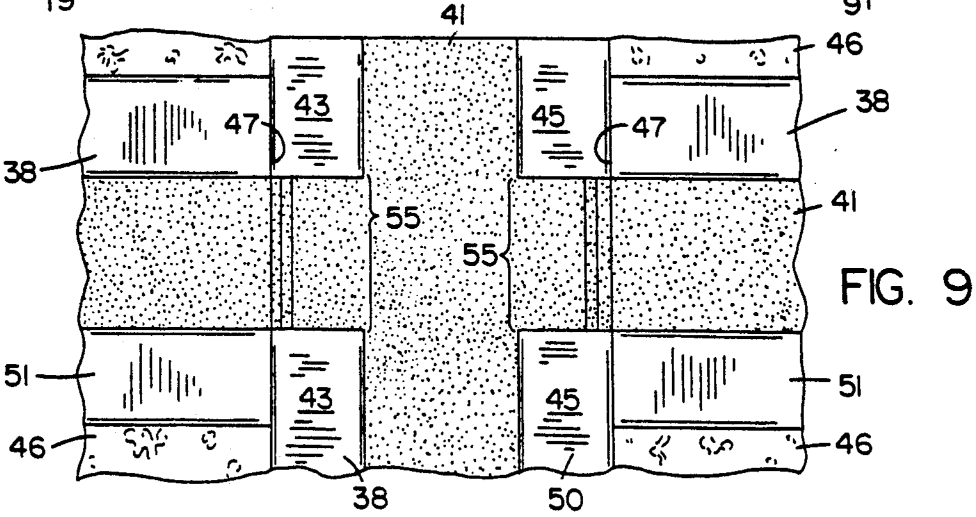
FIG. 9

METHOD OF MAKING A BEAM FOR A DECORATIVE SUSPENDED CEILING

This application is a division of application No. 07/797,629 filed Nov. 25, 1991, now a U.S. Pat. No. 5,241,798.

BACKGROUND

1. Field of the Invention

Ceilings of the suspended type use beam extending in grid form to support tile.

The beams are of an inverted T cross section having either a flat or a channel bottom flange.

This invention relates to the bottom flange.

2. Prior Art

Sometimes, it is desirable to use the beams and tiles in a suspended ceiling to achieve a decorative effect. An example is the achievement of a three-dimensional effect, as for instance by the use of a channel flange and a beveled tile. Such a prior art construction is shown, for instance, in U.S. Pat. No. 4,422,272 (the '272 patent). The inside of the channel may be of a different color from the outside. A beveled edge tile is often used with such an arrangement where the tile may be of the color that is inside the channel, or still a third color on the tile may be used.

Such prior art ceiling yields a three-dimensional effect and,when different colors are used, an additional color effect.

Such a ceiling, although pleasing to view, is more expensive than a "flat" ceiling wherein a flat tile rests on a flat flange, because of the channel design.

Where continuity of the flange is desired at the beam intersections, one solution has been to place a notch on the support member at the intersection, but this substantially weakens the U-channel flange. Another solution is to use a clip of the groove color disclosed in the '272 patent. Such clip adds to the cost and complexity of the ceiling.

SUMMARY OF THE PRESENT INVENTION

The present invention achieves a three-dimensional effect, and optionally, a color, material, or texture effect, in what is a flat ceiling. By a flat ceiling is meant one in which the flanges of the T cross-section grid beams are relatively thin and flat, as commonly produced for suspended ceilings, and the tile supported by the flanges is flat. Such a ceiling is the most economical to produce and install.

The three-dimensional effect is achieved by producing a flange which is formed by wrapping outer bends from a first strip from which the beam is being formed around a flat second strip, so that the effect from below is that of two surface levels in the flange, projecting to one standing on the floor and gazing at the ceiling, a pronounced three-dimensional effect. The second strip may be of a different material, texture, or color from the first material, to provide a decorative color effect and, in some instances, an even more pronounced three-dimensional effect.

Optionally, the bends of the flange may be cut out or notched at the intersections, exposing the inner second strip at these intersections in either direction. There is but a small amount of loss of beam strength from the notch at these intersections since the upper layer of the flange formed by the bends as well as the inner second strip remain intact at the cutouts. In effect what is a two-ply flange with lower bends is reduced in the vicinity of the intersection to two-ply only, which is more than adequate to maintain the integrity of the flange.

In effect, the present invention uses a flat flange T beam to achieve the three-dimensional effect of a channel T flange beam, without the increased cost and complexity of such prior art ceiling. Other effects can be obtained, when desired, by making the second strip of a different color, material, or texture from the first strip.

BRIEF DESCRIPTION OF THE DRAWINGS

FIG. 7 is a fragmentary perspective view showing a portion of metallic beam member having a lower terminal flange of the inverted T configuration and the second strip of this invention being intersected and interlocked by the terminal ends of two additional metallic beam members of like design. The beam members are shown supporting fragmentary end portions of three tiles or panels and the inner strips are continuous through the point of intersection.

FIG. 8 is an enlarged fragmentary sectional elevational view taken on the line 8,8 of FIG. 7, showing details of the interlocking beam members at a point of intersection, the abutment of the flanges of the left and right beam members to the centrally located beam flange and details of the cutout provided in the flange of the centrally located beam providing an aligned pathway for the strip.

FIG. 9 is a plan view taken on the line 9,9 of FIG. 8, illustrating the uninterrupted intersection of strip provided by the cutout.

BRIEF DESCRIPTION OF THE PREFERRED EMBODIMENT

Prior Art

Figure 1:
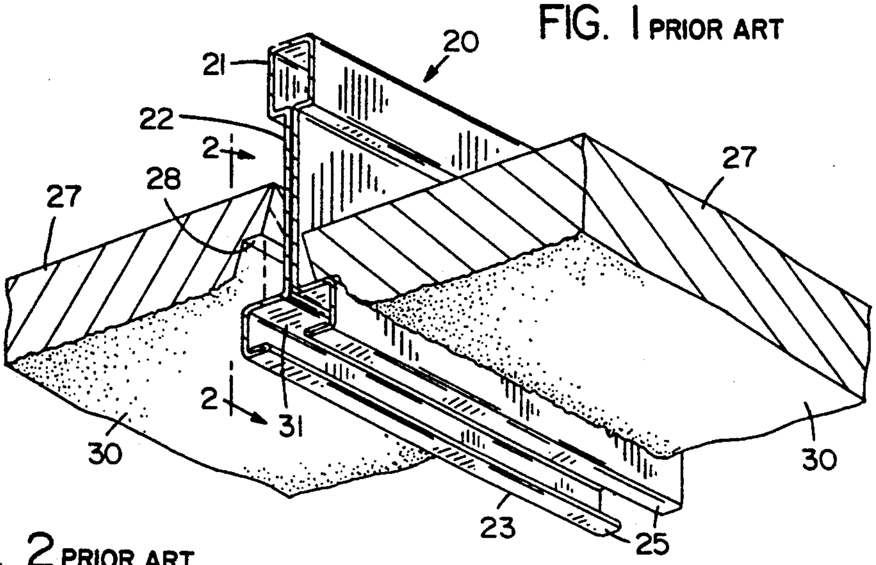
FIG. 1 PRIOR ART
FIG. 1 is a fragmentary perspective view illustrating a portion of a typical metallic beam member having a channel flange for the support of ceiling tiles or panels. Two fragmentary tiles are shown in the drawing; the left-hand panel being slightly elevated above the channel supporting flange to show the stepped configuration of the tile edge. The metallic beam member is often of a single color of white, but sometimes has a different color in the inner groove. This type of ceiling grid and panel construction is well known and is designated prior art.
Figure 2:
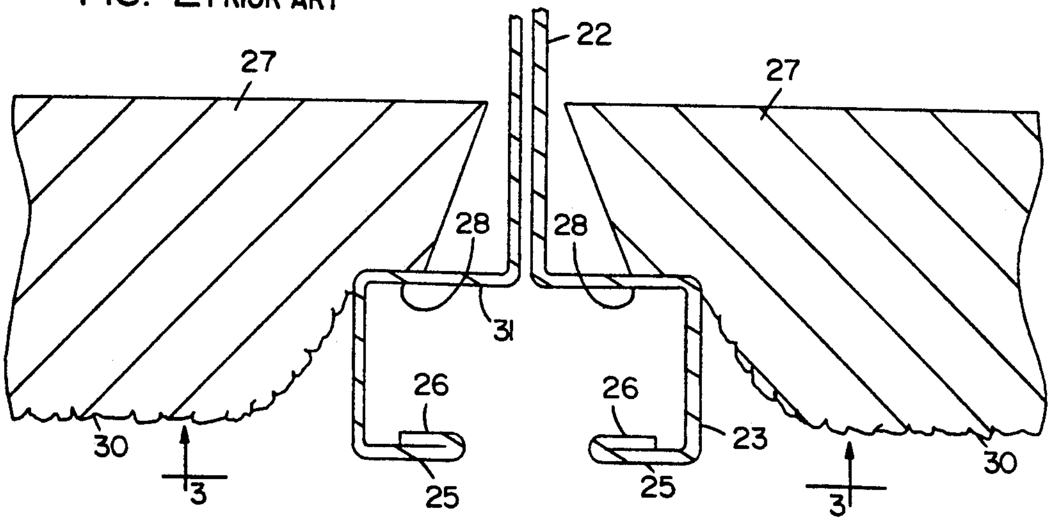
FIG. 2 PRIOR ART
FIG. 2 is an enlarged fragmentary sectional elevational view taken on the line 2,2 of FIG. 1, clearly showing details of the channel flange supporting the stepped edge of the ceiling tiles and designated prior art.
Figure 3:
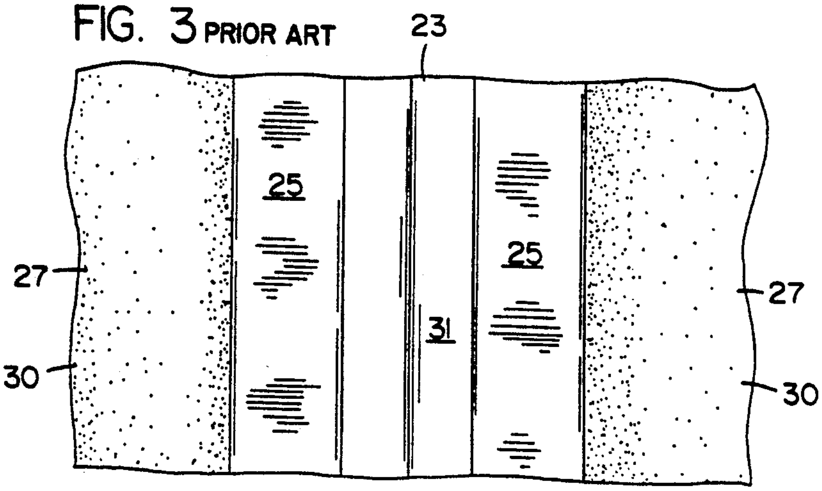
FIG. 3 PRIOR ART
FIG. 3 is a fragmentary bottom plan view taken on the line 3,3 of FIG. 2, illustrating additional visual details.

As seen in FIGS. 1 through 3, a beam 20 suspended in the usual way, has a bulb 21, web 22 and channel 23 with inwardly extending flats 25 folded back at 26. A tile 27 has an edge groove 28 so that the bottom 30 of tile 27 lies in a horizontal plane close to that of the plane of flats 25. As set forth in the '272 patent referred to earlier, the groove 31 in channel 23 is of a different color than flats 25. Tile 27 can be of the same color as either groove 31 or flats 25, or of a still different color. The total effect to a viewer from below is a three-dimensional color contrast.

Where continuity of the groove color is desired in all directions, at the intersection of the support beams with the transverse beams, it is necessary to either notch the channel or provide a special clip in order to provide continuity of the groove color in all directions, as seen in the '272 patent.

The Present Invention

Figure 4:
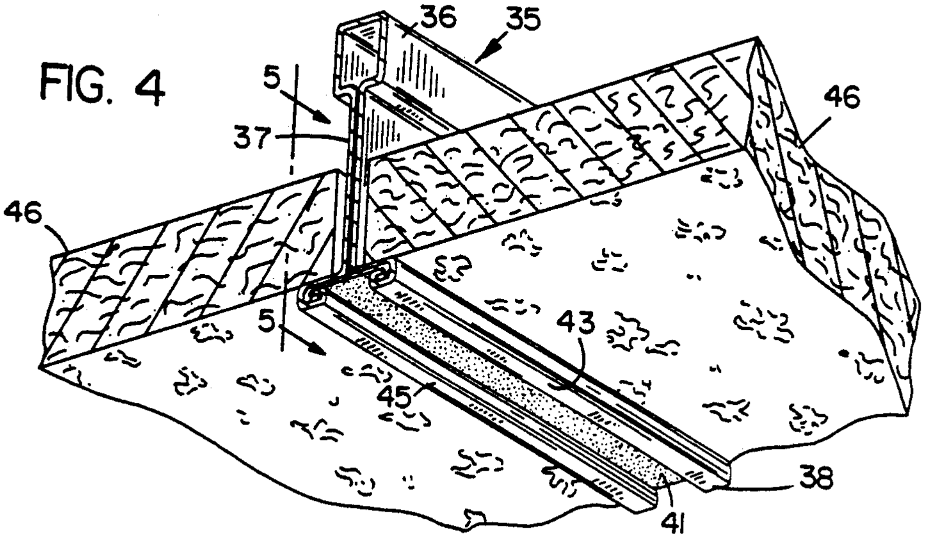
FIG. 4 is a fragmentary perspective view illustrating a portion of metallic grid member in the form of an inverted T with flanges that support ceiling tiles. Two fragmentary portions of ceiling tiles are shown in position in the drawing. The flange includes a second strip that is secured within the rolled flats of the flange, exposing the strip in a centrally located axially extending plane between the rolledover flats of the flange.
Figure 5:
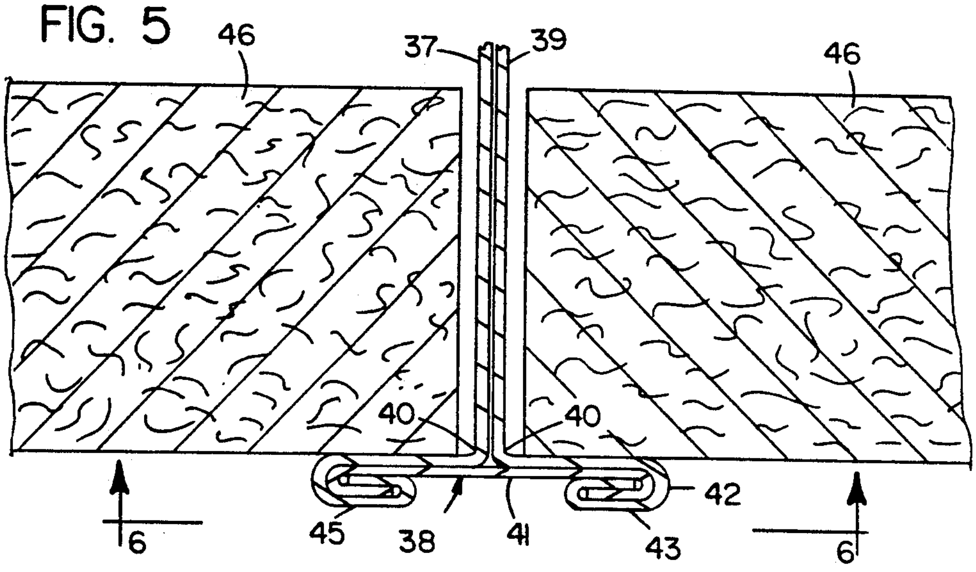
FIG. 5 is an enlarged fragmentary sectional elevational view taken on the line 5,5 of FIG. 4, showing details of the tile supporting flange and the included strip, secured by the rolled flats of the flange. The flange is shown supporting two fragmentary end portions of conventional ceiling tile.
Figure 6:
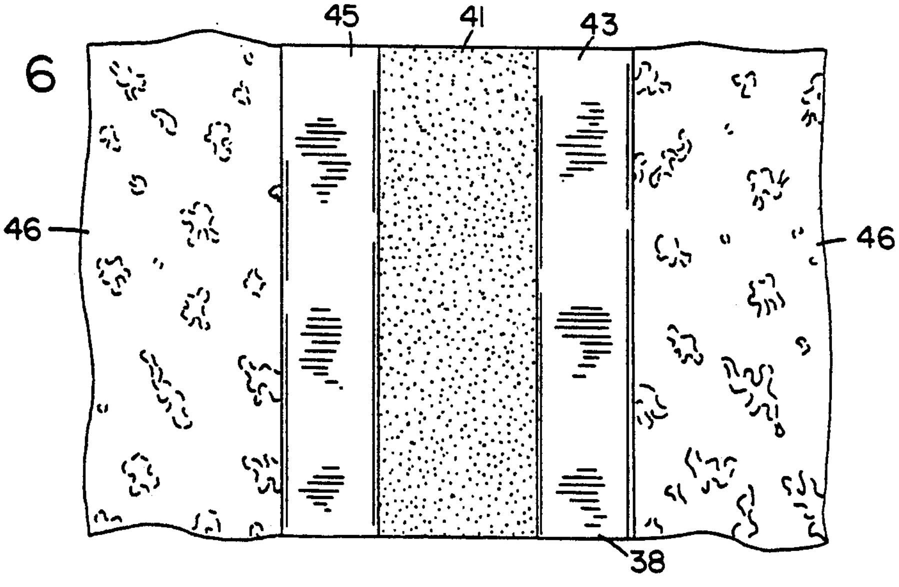
FIG. 6 is a fragmentary plan view taken on the line 6,6 of FIG. 5, showing the visual effect created when the flange flats are of a different color from the tiles and the centrally located second strip is of a contrasting color.

The present invention as seen in FIGS. 4 through 6 corresponds to FIGS. 1 through 3 described above as prior art. Beam 35 has, in conventional fashion, a bulb 36, a web 37, and a relatively flat flange 38.

It is flange 38 which is different and provides the invention.

When beam 35 is formed by, for instance, rolls, a first strip of metal 39 of a first color is bent symmetrically about the longitudinal center line, as well known, to form the bulb 36, and then bent into adjacent layers to form web 37. Each edge of the first strip 39 is then flared outwardly opposite one another to begin forming the flange of the T at 40. At this point, a flat second strip 41, preferably, but not necessarily, of a different material, texture, or color from strip 39, of a suitable width so as to permit first strip 39 to be bent around inner flat strip 41 at 42 and 43, is laid against the oppositely flared upper layer of flange 38. Strip 41 may be of metal, either similar or dissimilar to the flange metal; a vinyl, a fabric, or other suitable material, which may or may not have structural strength of its own.

Strips 39 and 41 are then continuously bent by the rolls until they achieve the final construction of flange 38 as seen for instance in cross section in FIG. 5. In such form, longitudinally extending flats 43 and 45 are formed along the exposed portion of longitudinally extending inner second strip 41. Flats 43 and 45 extend in a horizontal plane below the horizontal surface of second strip 41.

When viewed from below, as seen in FIGS. 4 and 6, flats 43 and 45 extend on either side of the exposed portion of strip 41 and are preferably of a different color and/or texture. The color and/or texture is applied to strips 39 and 41 when they are in flat, continuous web form, and before the strips are fabricated into the grid beam 35 described.

Flat tiles, or panels 46 are laid on flange 38 in the conventional manner. Tiles 46 may be of the same color as either flats 43 and 45 or strip 41, or of a different color.

When viewed from below, the ceiling of the invention achieves a three-dimensional effect among the tiles 46, flats 43 and 45, and strip 41. Particularly where a dark color, such as a dark bronze, is used on the inner strip 39, and an off-white on the flats, the effect is remarkably similar to that of the prior art channel flange described earlier. The slightly different planes of the inner strips and flats also contribute to the marked three-dimensional effect.

Additionally, in the prior art channel flange, it is necessary to use a grooved tile to bring its lower surface down toward the flats 25 of the channel 23, to avoid an unattractive vertical expanse between the flats 25 and the lower surface of tile 27, as seen in FIGS.. 1 through 3. An edge groove adds to the expense of the tile. No such grooved tile is necessary in the present invention. A regular, prior art, flat tile 46 is used. The lower surface of the tile is above the surface of flats 43 and 45, thus contributing to the three-dimensional effect.

It may be desirable to have continuous uninterrupted second strip 41 exposure in all directions at beam intersections. In FIGS. 7 through 9, there is shown the construction of flange 38 at the intersection of a main beam 50 and an intersecting beam 51, when the flange is notched. Beam 51 has a tongue 52, of any prior art design, passing through a slot 53 in main beam 50 and hooking thereto, again as well known.

Flats 43 and 45 are cut away at 55 to an extent that conforms to the width of the inner second strip 41 on intersecting beams 50 and 51, as seen in FIGS. 7 and 9.

Such cutout yields a cross shape of inner strip 41 and is desirably formed during the fabrication of the grid beam 35 by cutting the flat strips 39 and 41 prior to the bending operation as described earlier. The location of the cutout can be coordinated with the punching of slot 53.

Flange 38 is cut to provide an offset at 47 as is well known in the construction of intersecting beams for grid ceilings.

Main grid beam 50 remains relatively strong at the cutout location at 56, since flange 38 still has its upper surface as well as any structural strength from the inner flat strip 41. Of course, the beam continues to have the structure of web 37 and bulb 36.

When the beam construction of the invention is notched, when viewed from below as in FIGS. 7 and 9, the intersecting grid beams have continuous cross-shaped contrasting color exposed inner strip 41, with flat tiles 46 supported from flanges 38.

We claim:

1. In a method of making a beam for a grid ceiling wherein a first flat strip of metal extending longitudinally is continuously formed by rolls into a bulb, a web, and a flange to form an inverted T-shape in cross section, the improvement comprising continuously securing a second longitudinally extending flat strip into the beam flange by rolling outermost portions of the flange around the second strip, wherein the second strip is longitudinally exposed along the bottom of the flange.

2. The method of claim 1 wherein the outermost portions o the flange are periodically notched whereby the second strip is exposed across the entire bottom of the flange.

* * * * *